(12) United States Patent
de Sandro et al.

(10) Patent No.: US 6,862,900 B2
(45) Date of Patent: Mar. 8, 2005

(54) METHOD AND APPARATUS FOR REDUCING STRESS BETWEEN DEPOSITIONS WITHIN A SUBSTRATE TUBE

(75) Inventors: Jean-Philippe J. de Sandro, Beaconsfield (CA); Keith L. House, Corning, NY (US); Joohyun Koh, Horseheads, NY (US); Prantik Mazumder, Corning, NY (US)

(73) Assignee: Corning Incorporated, Corning, NY (US)

( * ) Notice: Subject to any disclaimer, the term of this patent is extended or adjusted under 35 U.S.C. 154(b) by 438 days.

(21) Appl. No.: 09/960,559

(22) Filed: Sep. 21, 2001

(65) Prior Publication Data

US 2003/0056549 A1 Mar. 27, 2003

(51) Int. Cl.$^7$ .............................................. C03C 13/00
(52) U.S. Cl. ............................ 65/397; 65/399; 65/415; 65/417; 65/421
(58) Field of Search ..................... 65/397, 399, 415, 65/417, 420, 421

(56) References Cited

U.S. PATENT DOCUMENTS

| | | | |
|---|---|---|---|
| 4,233,045 A | 11/1980 | Sarkar | 65/3 |
| 4,312,654 A | 1/1982 | Sarkar | 65/3.12 |
| 4,417,911 A | 11/1983 | Cundy et al. | 65/3.12 |
| 4,693,738 A * | 9/1987 | Hoshikawa et al. | 65/397 |
| 4,813,989 A | 3/1989 | Uchiyama et al. | 65/1 |
| 5,022,904 A * | 6/1991 | Ishiguro et al. | 65/397 |
| 5,242,476 A | 9/1993 | Bartel et al. | 65/3.11 |
| 6,116,055 A * | 9/2000 | Ishikawa et al. | 65/399 |
| 6,192,713 B1 | 2/2001 | Zhang et al. | 65/390 |
| 6,535,679 B2 * | 3/2003 | Yokoyama et al. | 385/127 |

OTHER PUBLICATIONS

T. Miya et al., *Ultimate Low–Loss Single–Mode Fibre at 1–55 μm*, Electronics Letters, pp. 106–108, vol. 15–No. 4, Feb. 15, 1979.

H. Wehr and D. Wiechert, *Refractive Index and Density of Fluorine Doped Silica Prepared by the PCVD Process*, Materials Research Bulletin, pp. 559–566, vol. 21–No. 5, May 1986.

* cited by examiner

Primary Examiner—Peter Chin
(74) Attorney, Agent, or Firm—Randall S. Wayland; Foley & Lardner

(57) ABSTRACT

A method and apparatus for forming a glass article such as an optical fiber having a substantially matching viscosity across an interface associated with a first section and a second section of the optical fiber is disclosed herein. The first section has a first halogen concentration and the second section has a second halogen concentration. At least one of a partial pressure of the second halogen provided to a substrate tube and a temperature of the substrate tube is configured to affect the concentration of the second halogen in the second section. Optical fiber embodiments are also included.

10 Claims, 4 Drawing Sheets

METHOD AND APPARATUS FOR REDUCING STRESS BETWEEN DEPOSITIONS WITHIN A SUBSTRATE TUBE

FIELD OF THE INVENTION

The present invention relates generally to optical fibers. More particularly, the present invention relates to reducing stress mismatch between depositions within a substrate tube.

BACKGROUND OF THE INVENTION

Lowering signal loss in an optical fiber is desirable because a signal can be transmitted a longer distance before signal amplification becomes necessary and/or at a reduced signal power. Of the silica-based class of optical fibers, pure silica-core optical fibers (i.e., without any more than trace amounts (less than about 0.3% by weight) of dopants in the core region) provide the lowest attenuation. Pure silica-core optical fibers can achieve an attenuation of 0.165 dB/km at 1550 nm in comparison with 0.19 dB/km at 1550 nm for a silica-core optical fiber doped with 3.2 mol % of $GeO_2$.

To achieve the necessary waveguiding characteristic, the cladding in a pure silica-core optical fiber is desired to be at a lower index of refraction than the cladding in a doped silica-core optical fiber. The lower index of refraction is required to contain the light primarily in the core. One way of lowering the index of refraction of the cladding without adversely affecting attenuation of the fiber is by fabricating the cladding doped with fluorine. A pure silica-core fiber with a doped cladding of approximately 1.3% by weight of fluorine is sufficient to provide the necessary index of refraction difference between the core and cladding for single mode operation in the 1550 nm wavelength region. Unfortunately, a pure silica-core fiber with a halogen doped cladding exhibits greater stress or viscosity mismatch between the core and cladding than a $GeO_2$ doped silica-core optical fiber. Stress between the core and cladding results in stress at different points along the fiber and/or induces index of refraction variation in the doped cladding.

Thus, there is a need for an optical fiber having attenuation comparable to that of at least a pure silica-core fiber and which provides the necessary waveguide function for signals in the infra-red wavelength region. There is a further need for fabricating adjacent sections of an optical fiber having reduced stress therebetween without requiring additional equipment and/or undue fabrication costs. There is a further need for fabricating adjacent sections of an optical fiber having reduced stress using a plasma chemical vapor deposition (PCVD) process.

SUMMARY OF THE INVENTION

In one embodiment, the invention relates to a method of manufacturing an optical fiber. The method includes providing a first section of a preform having a concentration of a first halogen, and providing a second section of the preform having a concentration of a second halogen of at least approximately 1% by weight. The method further includes processing the preform having the first and second sections to form an optical fiber having a stress between the first and second sections less than that of a pure silica optical fiber.

Another embodiment of the invention relates to an apparatus for coating a substrate tube used to form an optical fiber. The apparatus includes a gas delivery unit configured to provide gas mixtures inside of the substrate tube. The apparatus further includes a heat source surrounding at least a portion of the substrate tube. The inside of the substrate tube is formed a first section having a first halogen concentration and a second section having a second halogen concentration. The first section and the second section are formed as vitrified glass by the heat source and each of the first and the second concentrations are at least approximately 1% by weight.

Still another embodiment of the invention relates to an optical fiber. The fiber includes a first section doped with a concentration of a first element, and a second section abutting the first section along an axial direction and doped with a concentration of a second element. The concentration of the first element and the concentration of the second element are configured to provide a substantially matching viscosity across an interface associated with the first and the second sections. The optical fiber is a silica-based optical fiber.

Still another embodiment of the invention relates to a method of forming a glass article having a first section and a second section. The first section is adjacent to the second section, the first section has a concentration of a first halogen, and the second section has a concentration of a second halogen. The method includes providing a gas mixture to a glass tube, and first coating the glass tube to form the first section. The method further includes second coating the first section to form the second section, and processing the glass tube having the first and second sections to form the glass article. At least one of a partial pressure of the second halogen in the gas mixture and a temperature of the glass tube is configured to affect the concentration of the second halogen in the second section.

BRIEF DESCRIPTION OF THE DRAWINGS

The exemplary embodiments will become more fully understood from the following detailed description, taken in conjunction with the accompanying drawings, wherein like reference numerals denote like elements, in which.

DETAILED DESCRIPTION OF THE EXEMPLARY EMBODIMENTS

An advantageous method for providing deposition(s) to the inside of a substrate tube using a plasma chemical vapor deposition (PCVD) process is disclosed herein. In exemplary embodiments, operating conditions associated with the PCVD process are configured to provide depositions within the substrate tube that have a reduced stress.

Figure 1:
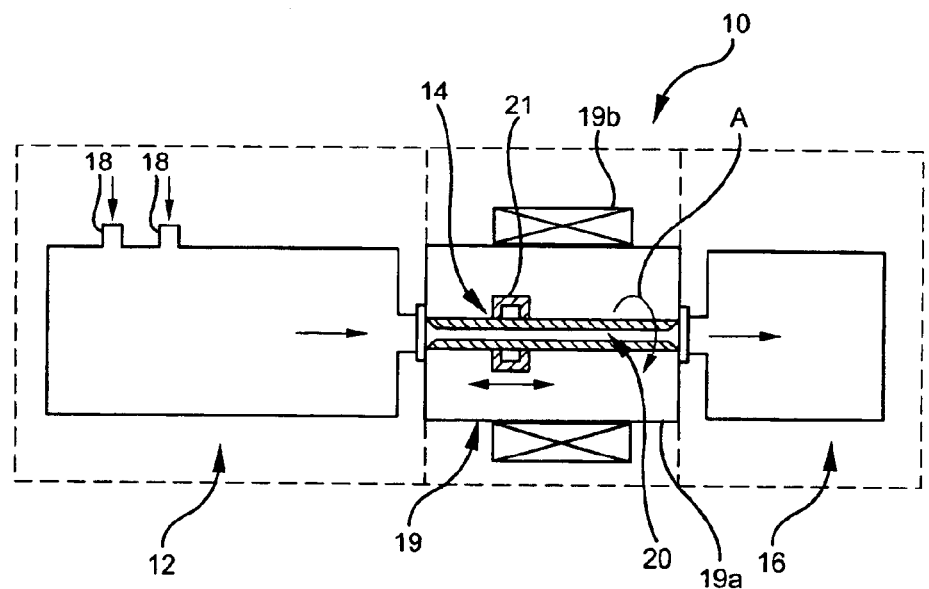
FIG. 1 is a simplified block diagram of a plasma chemical vapor deposition (PCVD) system.

Referring to FIG. 1, there is shown a simplified block diagram of a PCVD system or lathe 10. PCVD system 10 includes a gas supply unit 12, a reaction zone 14, and an exhaust pumping unit 16. Reaction zone 14 is provided between gas supply unit 12 and exhaust pumping unit 16.

Gas supply unit 12, also referred to as a gas delivery unit, is configured to receive one or more gases (e.g., $SiCl_4$, $O_2$, $GeCl_4$, $C_2F_6$, etc.) at gas inlets 18 and provide a gas mixture having certain flow, composition, and pressure characteristics, to be described in greater detail hereinafter, to reaction zone 14. Gas supply unit 12 can further include gauges, a rotary union, a bellow, couplers, o-rings, sealers, and/or a variety of other components to provide a desirable gas mixture to reaction zone 14. It should be understood that gas supply unit 12 is not described in a limiting fashion.

The gas mixture from gas supply unit 12 is received inside a substrate tube 20. Substrate tube 20 (shown as cross-sectioned for clarity) is provided within reaction zone 14 and its opposite ends connect to gas supply unit 12 and exhaust pumping unit 16. Substrate tube 20 rotates along its longitudinal axis during deposition as indicated by arrow "A." In one embodiment, substrate tube 20 is a hollow tube comprised of a silica-based material, a length in the range of 1–3 m, and an inner diameter of 1–3 cm. Alternatively, substrate tube 20 can be comprised of a fluorine-doped silica material.

Reaction zone 14 includes a microwave applicator 21 and may also include a heating source 19. The heating source 19 preferably encloses substrate tube 20 and microwave applicator 21. The heating source 19 may be an electrically heated oven or furnace including a housing 19a and one or more heating elements 19b, and is configured to maintain substrate tube 20, or at least a portion thereof, at a specific temperature during deposition.

Figure 4:
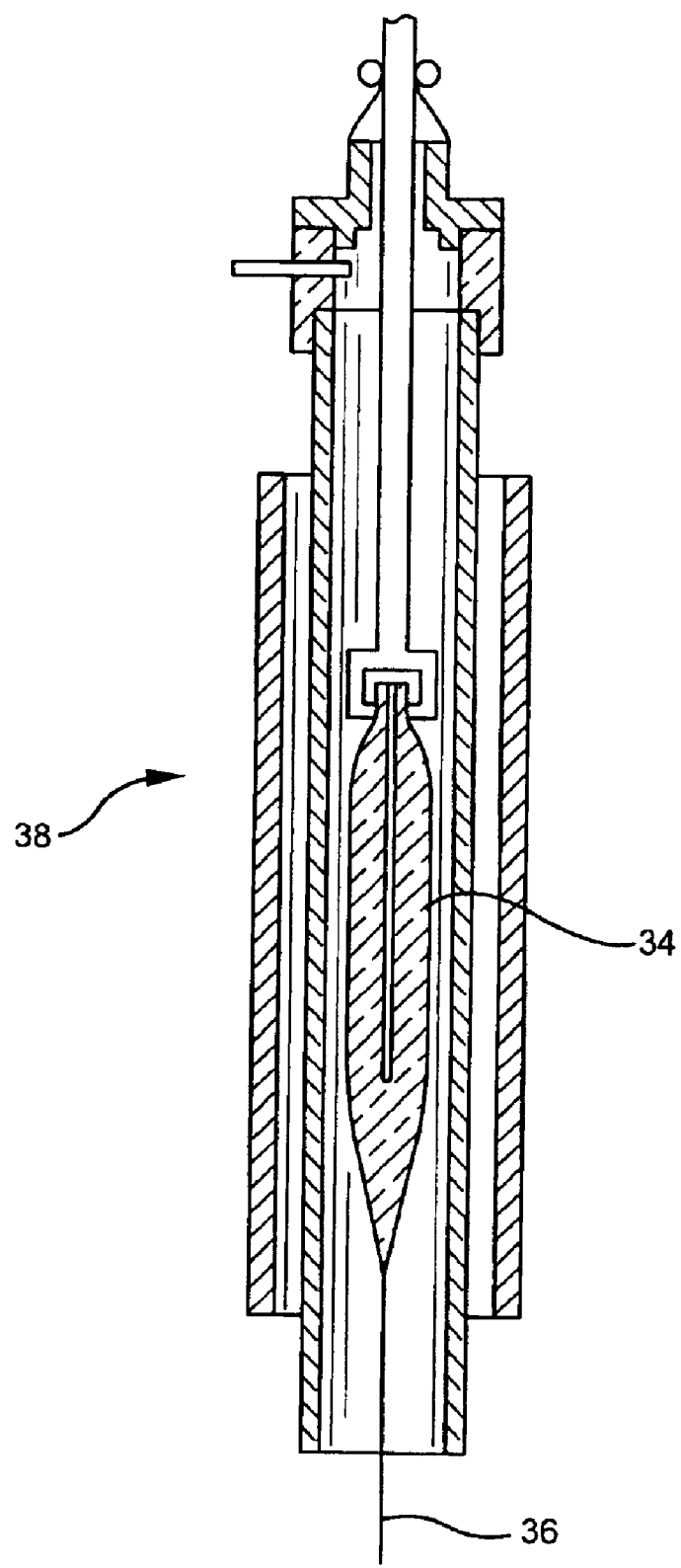
FIG. 4 is a cross-sectional view of a draw furnace showing fiber being drawn from a preform.

The gas mixture transported into the inside or internal region of tube 20 is transformed into a local area of plasma with the aid of microwave applicator 21. This plasma drives the coating or deposition of materials onto each given internal region of tube 20 as microwave applicator 21 traverses along the corresponding exterior region of tube 20. Depending on the time dependent composition and/or the elements comprising the gas mixture, one or more distinct layers can be formed in the internal region of tube 20. Preferably, tube 20 after the deposition process(es) is collapsed to form a solid collapsed cane or fiber optic preform. The collapsed preform 34 may be subsequently drawn into optical fiber 36 by conventional methods, such as in the draw furnace 38 shown in FIG. 4.

As an example, operating conditions for the PCVD system 10 may include a temperature associated with tube 20 in the range of approximately 900–1200° C., a microwave applicator traverse rate in the range of approximately 13–20 cm/sec, a microwave applicator traverse distance of approximately 100 cm or less, and a total pressure of the gas mixture in the range of 3–15 Torr.

Figure 2:
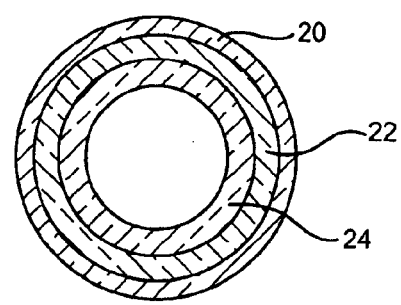
FIG. 2 is a cross-sectional view of a substrate tube after deposition using the PCVD system illustrated in FIG. 1.
Figure 5:
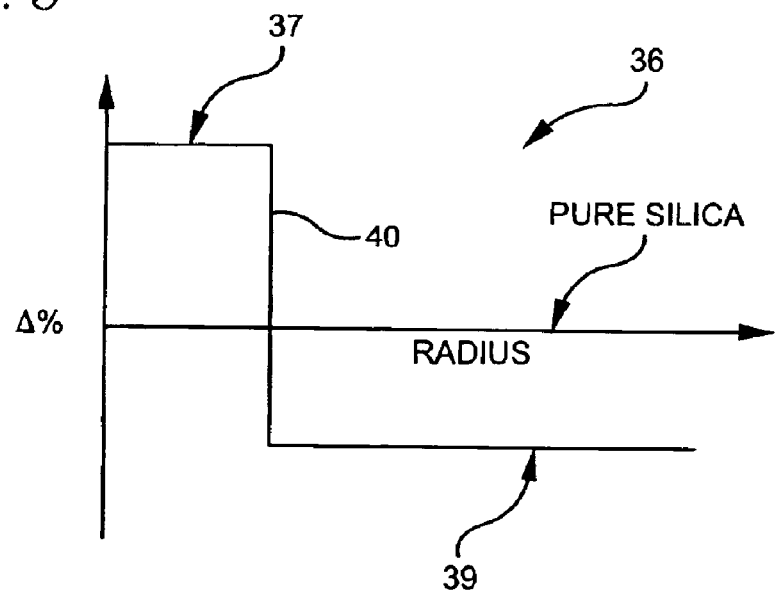
FIG. 5 is a plot of a refractive index profile of an embodiment of optical fiber in accordance with the invention.
Figure 6:
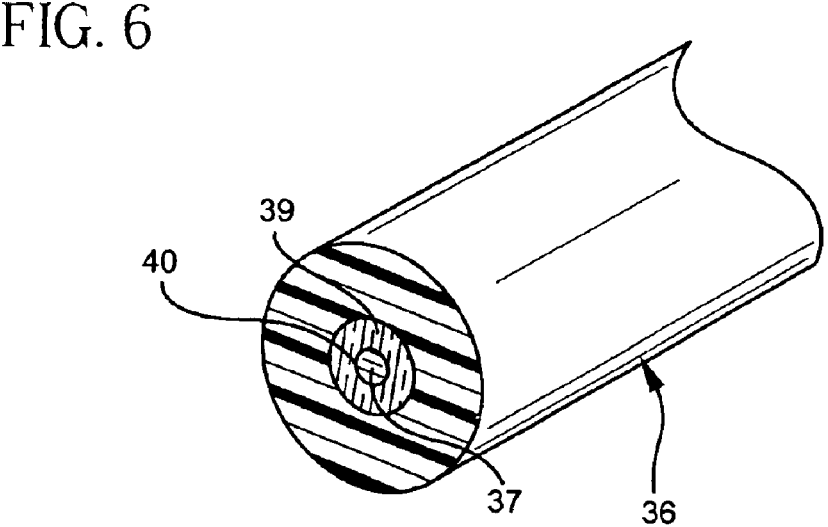
FIG. 6 is a prespective, cross-sectional view of an optical fiber in accordance with the invention.

Referring to FIG. 2, there is shown a cross-sectional view of substrate tube 20 after deposition of a first section or layer 22 and a second section or layer 24. In one embodiment, tube 20 and first section 22 can comprise a cladding of a resulting optical fiber, and second section 24 can comprise a core of the resulting optical fiber. In another embodiment, a plurality of layers may be deposited within tube 20, each layer preferably being of a different composition relative to each other. The resulting fiber 36 has a core region 37 corresponding to the innermost deposited layers and the cladding region 39 corresponding to the remaining layers (and optionally even of tube 20 itself) as is illustrated in FIGS. 5 and 6.

As is illustrated in FIG. 2, first section 22 (e.g. cladding) is first deposited inside tube 20. First section 22 is doped with a first halogen at a preferred concentration of at least 1.0% by weight. Preferably, the first halogen concentration in first section 22 is in the range of approximately 1.0–1.3% by weight. The first halogen may be fluorine, for example, provided from a gas mixture of $SiCl_4$, $O_2$, and $C_2F_6$ transformed into a low-pressure (e.g., 10 Torr) plasma inside tube 20. A preferred ratio of $O_2$:$SiCl_4$ flow during deposition of first section 22 is approximately 4:1. A temperature provided by the heating source during deposition of first section 22 is preferably approximately 1000–1200° C. Optionally, the temperature is configured to prevent or minimize certain dopants (e.g., chlorine) from being incorporated into first section 22.

The second section 24 (e.g., core) is deposited over first section 22. Second section 24 is doped with a second halogen at a preferred concentration of approximately equal to or greater than 1.0% by weight. Preferably, the second halogen concentration in second section 24 is in the range of approximately 0.7–1.0% by weight. The second halogen can be chlorine, provided from a gas mixture comprised of, for example, at least $SiCl_4$ and $O_2$. The combined thickness of first and second sections 22, 24 is approximately 1–3 mm.

The operating conditions of PCVD system 10 are configured to form first section 22 predominantly incorporated or doped with only the first halogen and second section 24 predominantly incorporated or doped with only the second halogen. The first halogen concentration in second section 24, at a location away from an interface between first and second sections 22, 24, is preferably less than approximately 0.1% by weight. The second halogen concentration in first section 22, at a location away from the interface between first and second sections 22, 24, can approach zero percent by weight. The concentration distribution or profile of the second halogen in second section 24, after tube 20 has been converted into a collapsed cane, can be a step function, a Gaussian distribution, an exponential function, or a variety of other transitions from the minimum concentration in first section 22 to the maximum concentration in second section 24.

In one embodiment, the concentration of the second halogen in second section 24, as discussed above, can be achieved by providing a temperature inside of tube 20 during deposition of second section 24 that is lower than during deposition of first section 22. A lower temperature during deposition of second section 24 enhances incorporation of the second halogen (e.g., chlorine) into second section 24 while maintaining a low level of the second halogen in first section 22. Since the temperature of the inside of tube 20 is a function of the temperature of the heating source, lowering the temperature of the heating source from about 1150° C. to 1000° C. during deposition of second section 24 results in approximately a 2.5 fold increase in the chlorine concentration in second section 24, compared to a similar optical fiber formed with its laydown temperature kept constant at approximately 1150° C. throughout the depositions. A drop in the temperature of the heating source of approximately 100–300° C. from laydown or deposition of first section 22 to second section 24 forms second section 24 comprised of $SiO_2$ glass with a chlorine dopant concentration of approximately 1.0% by weight.

It is contemplated that components other than the heating source may affect the temperature inside tube 20 during deposition. As an example, the proximity, strength, and/or type of the microwave applicator may influence the temperature inside tube 20. As an another example, microwave power level or pressure may also affect the temperature inside tube 20 by as much as 200° C.

Figure 3:
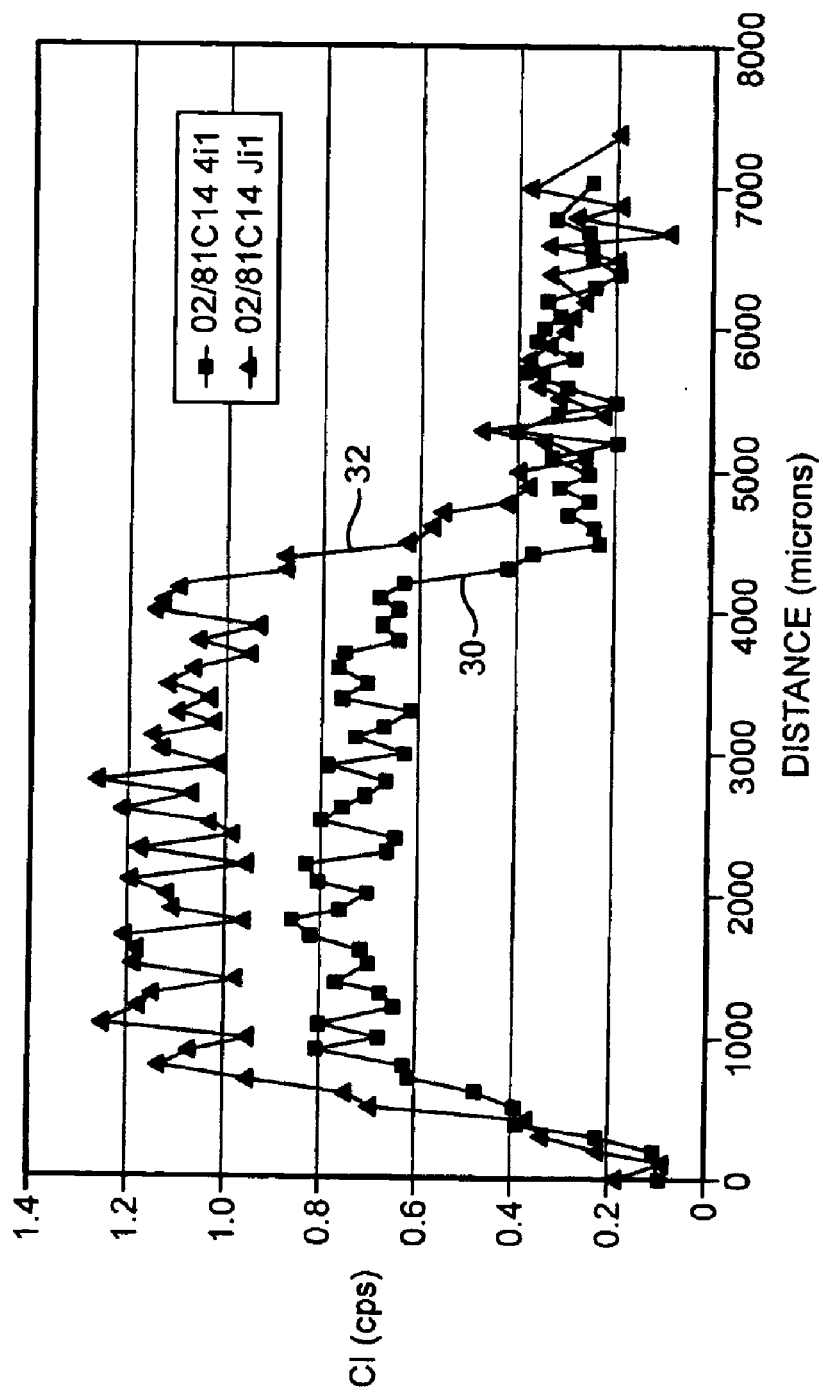
FIG. 3 is a plot showing chlorine concentration versus position for various gas mixture ratios provided in the PCVD system illustrated in FIG. 1.

In another embodiment, the concentration of the second halogen in second section 24, as discussed above, can be achieved by increasing the partial pressure of the second halogen in the gas mixture during deposition of second section 24. The partial pressure of the second halogen in the gas mixture during deposition of second section 24 is approximately 2–10 Torr. The ratio of $O_2$:$SiCl_4$ is preferably approximately 3:1–2:1 during laydown or deposition of second section 24. FIG. 3 shows chlorine concentrations in $SiO_2$ glass formed in the presence of different ratios of $O_2$ and $SiCl_4$ gases. Plot line 30 shows a maximum chlorine concentration in the range of 0.6–0.85 count per second (cps) for an $O_2$:$SiCl_4$ ratio of 4:1. Plot line 32 shows a maximum chlorine concentration in the range of 0.9–1.25 cps for an $O_2$:$SiCl_4$ ratio of 3:1.

In this manner, the temperature inside tube 20 or the ratio of $O_2$ and $SiCl_4$ gases can be individually or jointly adjusted to form a silica-based optical fiber having a desirable chlorine dopant concentration in the core. Increasing the chlorine concentration in the $SiO_2$ core results in a lower viscosity glass or softer core while the index of refraction of the core is substantially maintained at that of pure $SiO_2$ glass.

Hence, as shown in FIG. 5, the resulting optical fiber 36 exhibits the refractive index profile necessary for the waveguiding property (due to the silica-containing core 37 and fluorine-doped cladding 39), and a total attenuation potential of approximately 0.183 dB/km or less (e.g., approximately 0.14–0.17 dB/km) at between about 1520–1570 nm and a Raleigh scattering part of the attenuation of approximately 0.14 dB/km at an infra-red wavelength range (e.g., 1500–1570 nm) (due to the reduced stress or viscosity mismatch between the core 37 and cladding 39). The difference in the viscosity between the core 37 and cladding 39, especially at the interface 40 between the core and cladding, induces a stress (i.e., a tensile and compression stress) within the optical fiber 36 that can increase signal propagation non-uniformity, affect the refractive index of the cladding, and/or signal loss. The stress between the core 37 and cladding 39 can be reduced approximately by a factor of 2 by increasing the amount of chlorine in the core by a factor of approximately 4. For example, a silica-based fiber with approximately 0.25% by weight of chlorine in the core exhibits a stress of approximately 30 Mpa between the core and cladding. In contrast, a silica-based fiber with approximately 1% by weight of chlorine in the core 37 exhibits a stress of approximately 15 Mpa between the core 37 and cladding 39. When a silica-based fiber includes a chlorine concentration greater than 1% by weight in the core, such fiber 36 can exhibit a stress less than 10 Mpa between the core 37 and cladding 39.

It should be understood that differences in viscosity typically present at other interfaces or abutting sections of a fiber profile may also be reduced by a factor of 2 or more by increasing a halogen (e.g., chlorine) dopant concentration in at least one of the affected sections during fabrication of the fiber. The use of an PCVD process to achieve the desirable halogen doping in select section(s) of the fiber profile offers the advantage of an one step process where each given section is fabricated or deposited and simultaneously doped with a desirable concentration distribution. Thus, interface problems due to sleeving employed in the prior art that can potentially cause high scattering loss in the fiber can be avoided.

It is understood that although the detailed drawings, specific examples, and particular values describe the exemplary embodiments of the present invention, they are for purposes of illustration only. The exemplary embodiments of the present invention are not limited to the precise details and descriptions described herein. For example, although particular materials, ranges, or characteristics are described, other materials can be utilized and characteristics can result. Various modifications may be made in the details disclosed without departing from the scope of the invention as defined in the following claims.

What is claimed is:

1. A method of forming a glass article having a first section and a second section, the first section adjacent the second section, the method comprising the steps of:

providing a gas mixture to a glass tube said gas mixture including a silica precursor;

first coating the inside of the glass tube to form the first section containing silica;

second coating the first section to form the second section containing silica wherein the first section has a concentration of a first halogen and the second section has a concentration of a second halogen and wherein the first and second halogen comprise a different composition; and processing the glass tube having the first and second sections to form the glass article wherein at least one of a partial pressure of the second halogen in the gas mixture and a temperature of the glass tube is configured to affect the concentration of the second halogen in the second section.

2. The method of claim 1 further including configuring the temperature of the glass tube to be less during the second coating step than during the first coating step.

3. The method of claim 2 wherein the configuring step includes configuring the temperature of the glass tube during the second coating step to be between about 100° C. and 300° C. less than during the first coating step.

4. The method of claim 1 wherein the providing step includes providing the partial pressure of the second halogen during the second coating step in the range of 2–10 Torr.

5. The method of claim 1 wherein the temperature of the glass tube is a temperature of an internal portion of the glass tube.

6. The method of claim 1 wherein the second halogen is chlorine and the concentration of the second halogen in the second section is in a range of between about 0.7% and 1.0% by weight.

7. The method of claim 6 wherein the first halogen is fluorine and the concentration of the first halogen in the first section is in a range of between about 1.0% and 1.3% by weight.

8. The method of claim 1 wherein the first halogen is fluorine and the second halogen is chlorine.

9. The method of claim 1 wherein the glass tube comprises fluorine-doped silica.

10. The method of claim 1 wherein the first section is predominantly doped with only the first halogen and the second section is predominantly doped with only the second halogen.

\* \* \* \* \*